United States Patent
McNutt et al.

(10) Patent No.: US 10,169,182 B2
(45) Date of Patent: Jan. 1, 2019

(54) MONITORING LEVELS OF UTILIZATION OF DEVICE

(71) Applicant: International Business Machines Corporation, Armonk, NY (US)

(72) Inventors: Bruce McNutt, Gilroy, CA (US); Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1190 days.

(21) Appl. No.: 14/447,997

(22) Filed: Jul. 31, 2014

(65) Prior Publication Data

US 2016/0034373 A1 Feb. 4, 2016

(51) Int. Cl.
| | |
|---|---|
| *G06F 11/30* | (2006.01) |
| *G21C 17/00* | (2006.01) |
| *G06F 11/34* | (2006.01) |
| *G06F 9/50* | (2006.01) |

(52) U.S. Cl.
CPC ............ *G06F 11/3006* (2013.01); *G06F 9/50* (2013.01); *G06F 11/3433* (2013.01); *G06F 11/3442* (2013.01); *G06F 11/3419* (2013.01)

(58) Field of Classification Search
None
See application file for complete search history.

(56) References Cited

U.S. PATENT DOCUMENTS

| | | | | |
|---|---|---|---|---|
| 5,937,205 | A | * | 8/1999 | Mattson .............. G06F 13/1642 710/41 |
| 7,565,644 | B2 | | 7/2009 | Johnson et al. |
| 7,581,008 | B2 | | 8/2009 | Zhang et al. |
| 7,814,486 | B2 | | 10/2010 | Papakipos et al. |
| 8,473,922 | B2 | | 6/2013 | Li et al. |
| 8,560,667 | B2 | | 10/2013 | Kikuchi et al. |

(Continued)

FOREIGN PATENT DOCUMENTS

| | | |
|---|---|---|
| CN | 101198141 A | 6/2008 |
| EP | 1993220 A1 | 11/2008 |

(Continued)

OTHER PUBLICATIONS

Fontoura, "Inverted Index Support for Numeric Search", Sep. 12, 2005, pp. 1-22.

(Continued)

*Primary Examiner* — Roy Y Yi
*Assistant Examiner* — Geoffrey T Evans
(74) *Attorney, Agent, or Firm* — Edward J. Wixted, III

(57) ABSTRACT

Monitoring a level of utilization is provided. A threshold is determined based, at least in part, on a count of service channels of a device. An upper boundary value of a numerical range is determined based, at least in part, on the count of service channels. A lower boundary value of the numerical range is determined based, at least in part, on the threshold. Whether a count of outstanding requests of the device is contained within the numerical range is determined. An estimated level of utilization of the device is determined based, at least in part, on the upper boundary value, the lower boundary value, the count of service channels, and the count of outstanding requests. The estimated level of utilization is reported.

20 Claims, 5 Drawing Sheets

(56) References Cited

U.S. PATENT DOCUMENTS

| | | | |
|---|---|---|---|
| 8,599,684 | B1 | 12/2013 | Goertz et al. |
| 8,667,120 | B2 | 3/2014 | Kurebayashi et al. |
| 9,537,740 | B2 * | 1/2017 | McNutt .............. G06F 11/3485 |
| 2001/0054020 | A1 | 12/2001 | Barth et al. |
| 2002/0021686 | A1 | 2/2002 | Ozluturk et al. |
| 2003/0046396 | A1 * | 3/2003 | Richter .................. G06F 9/505 |
| | | | 709/226 |
| 2003/0055327 | A1 | 3/2003 | Shaw et al. |
| 2003/0065986 | A1 | 4/2003 | Fraenkel et al. |
| 2005/0018611 | A1 | 1/2005 | Chan et al. |
| 2008/0144493 | A1 | 6/2008 | Yeh |
| 2009/0271511 | A1 | 10/2009 | Peracha |
| 2011/0013537 | A1 | 1/2011 | Paclik et al. |
| 2011/0022806 | A1 | 1/2011 | Wang et al. |
| 2011/0296463 | A1 | 12/2011 | Suslov |
| 2012/0023117 | A1 | 1/2012 | Butt et al. |
| 2013/0091086 | A1 | 4/2013 | Hively |
| 2013/0091168 | A1 | 4/2013 | Bhave et al. |
| 2013/0121587 | A1 | 5/2013 | Brandt |
| 2013/0318283 | A1 | 11/2013 | Small et al. |
| 2013/0326485 | A1 | 12/2013 | Ghosh et al. |
| 2014/0025823 | A1 | 1/2014 | Szabo et al. |
| 2016/0007226 | A1 | 1/2016 | Kim et al. |

FOREIGN PATENT DOCUMENTS

| | | | |
|---|---|---|---|
| JP | 2000090093 A | 3/2000 | |
| JP | 2012190092 A | 10/2012 | |
| WO | 2012098666 A1 | 7/2012 | |

OTHER PUBLICATIONS

Sabatini, "Numerical Search of Bounded Relative Satellite Motion", Nonlinear Dynamics and Systems Theory, 6 (4) (2006) pp. 411-419, Received: Jul. 19, 2005, Revised: Oct. 10, 2006, copyright 2006 Informath Publishing Group/1562-8353.

McNutt, Bruce, "Waiting for a Black Box", CMG Proceedings, Nov. 2013.

McNutt, Bruce, "Monitoring Device Usage", U.S. Appl. No. 14/447,856, filed Jul. 31, 2014.

McNutt et al., "Monitoring Device Usage", U.S. Appl. No. 14/447,879, filed Jul. 31, 2014.

Appendix P, List of IBM Patents or Patent Applications Treated as Related.

Bierman et al. "With-defaults Capability for NETCONF (RFC6243)", Original Publication Date: Jun. 1, 2011, IP.com Number: IPCOM000208317D, IP.com Electronic Publication: Jul. 1, 2011, pp. 1-26.

Liu et al., "On the Multi-Server Machine Interference With Modified Bernoulli Vacation", Journal of Industrial and Management Optimization, vol. 10, No. 4, Oct. 2014, pp. 1191-1208, doi:10.3934/jimo.2014.10.1191.

* cited by examiner

US 10,169,182 B2

MONITORING LEVELS OF UTILIZATION OF DEVICE

BACKGROUND OF THE INVENTION

The present invention relates generally to the field of system performance management, and more particularly to monitoring device usage.

In the field of information technology (IT), system performance management pertains to the monitoring and measurement of relevant performance metrics of a computing system. Such performance metrics include measurements of utilization of resources such as processors, memory, or storage media. Information gained through system performance management can grant insights useful for outage prevention or remediation, service level management, and capacity planning. This information improves an organization's ability to allocate IT resources where needed and to plan for future IT needs.

Queueing theory is the mathematical study of queues. In queueing theory, a model is constructed so that queue lengths, waiting times, and other metrics can be predicted. In the context of computing, examples of queues include streaming a video, where a router queues packets of data waiting to be transmitted to another router. Another example includes a hardware component of a computer, such as a network adapter, that queues incoming or outgoing packets that are waiting to be processed or transmitted by the network adapter.

SUMMARY

According to one embodiment of the present disclosure, a method for monitoring a level of utilization is provided. The method includes: determining, by one or more processors, a threshold based, at least in part, on a count of service channels of a device; determining, by one or more processors, an upper boundary value of a numerical range based, at least in part, on the count of service channels; determining, by one or more processors, a lower boundary value of the numerical range based, at least in part, on the threshold; determining, by one or more processors, whether a count of outstanding requests of the device is contained within the numerical range; determining, by one or more processors, an estimated level of utilization of the device based, at least in part, on the upper boundary value, the lower boundary value, the count of service channels, and the count of outstanding requests; reporting, by one or more processors, the estimated level of utilization.

According to another embodiment of the present disclosure, a computer program product for monitoring a level of utilization is provided. The computer program product comprises a computer readable storage medium and program instructions stored on the computer readable storage medium. The program instructions include program instructions to determine a threshold based, at least in part, on a count of service channels of a device; program instructions to determine an upper boundary value of a numerical range based, at least in part, on the count of service channels; program instructions to determine a lower boundary value of the numerical range based, at least in part, on the threshold; program instructions to determine whether a count of outstanding requests of the device is contained within the numerical range; program instructions to determine an estimated level of utilization of the device based, at least in part, on the upper boundary value, the lower boundary value, the count of service channels, and the count of outstanding requests; program instructions to report the estimated level of utilization.

According to another embodiment of the present disclosure, a computer system for monitoring a level of utilization is provided. The computer system includes one or more computer processors, one or more computer readable storage media, and program instructions stored on the computer readable storage media for execution by at least one of the one or more processors. The program instructions include program instructions to determine a threshold based, at least in part, on a count of service channels of a device; program instructions to determine an upper boundary value of a numerical range based, at least in part, on the count of service channels; program instructions to determine a lower boundary value of the numerical range based, at least in part, on the threshold; program instructions to determine whether a count of outstanding requests of the device is contained within the numerical range; program instructions to determine an estimated level of utilization of the device based, at least in part, on the upper boundary value, the lower boundary value, the count of service channels, and the count of outstanding requests; program instructions to report the estimated level of utilization.

DETAILED DESCRIPTION

Queueing theory, a discipline within the mathematical theory of probability, is the mathematical study of waiting lines, or queues. Queueing theory can be applied to computing in the context of system performance management. In the parlance of queueing theory, a node has a queue of jobs that are served (or processed) by one or more servers. The quantity of servers is denoted by c. For example, a computer component such as a network adapter (i.e., a node) has a queue of packets (i.e., jobs) that are served by one or more ports of the adapter (i.e., one or more servers). In queueing theory, a server is a channel by which service is provided, as is explained in further detail below. As used herein, a server is also referred to as a service channel.

Embodiments of the present invention provide that the measured average number of outstanding requests during a measurement interval is mathematically related to the number of servers and the average device utilization. For example, evaluating Formula 3, given below, by substituting the number of servers for c and the average device utilization for G yields the number of outstanding requests, represented, in this case, by N'. However, embodiments recognize that calculating the value of G by Formula 3 is computationally prohibitive for embedded processors, even if N' and c are known. Embodiments of the present disclosure provide for estimating average device utilization with increased computational efficiency.

Embodiments of the present invention recognize that the mathematics required to calculate the average utilization of a component often includes logarithmic and exponential functions. Such functions are typically unsupported or are computationally prohibitive for an embedded processor of a component such as a network adapter. Embodiments of the present invention provide for estimating with increased computational efficiency the average utilization of a component with c servers. In some embodiments, an initial utilization estimate is calculated based, in part, on the value of c, and subsequent utilization estimates are calculated based on the results of prior calculations.

Embodiments of the present invention recognize that the number of servers (i.e., c) of a component is not always known. Embodiments of the present invention provide for estimating a value of c that best describes the observed behavior of the component.

Embodiments of the present invention recognize that, in some cases, the effective number of servers delivered by a system (i.e., c) is subject to change due to operational conditions including the workload, time of day and current system bottlenecks. Embodiments of the present invention provide for estimating the effective number of servers. In some embodiments, calculations are based, at least in part, on a measurement of response times, which queueing delays may elongate.

Figure 1:
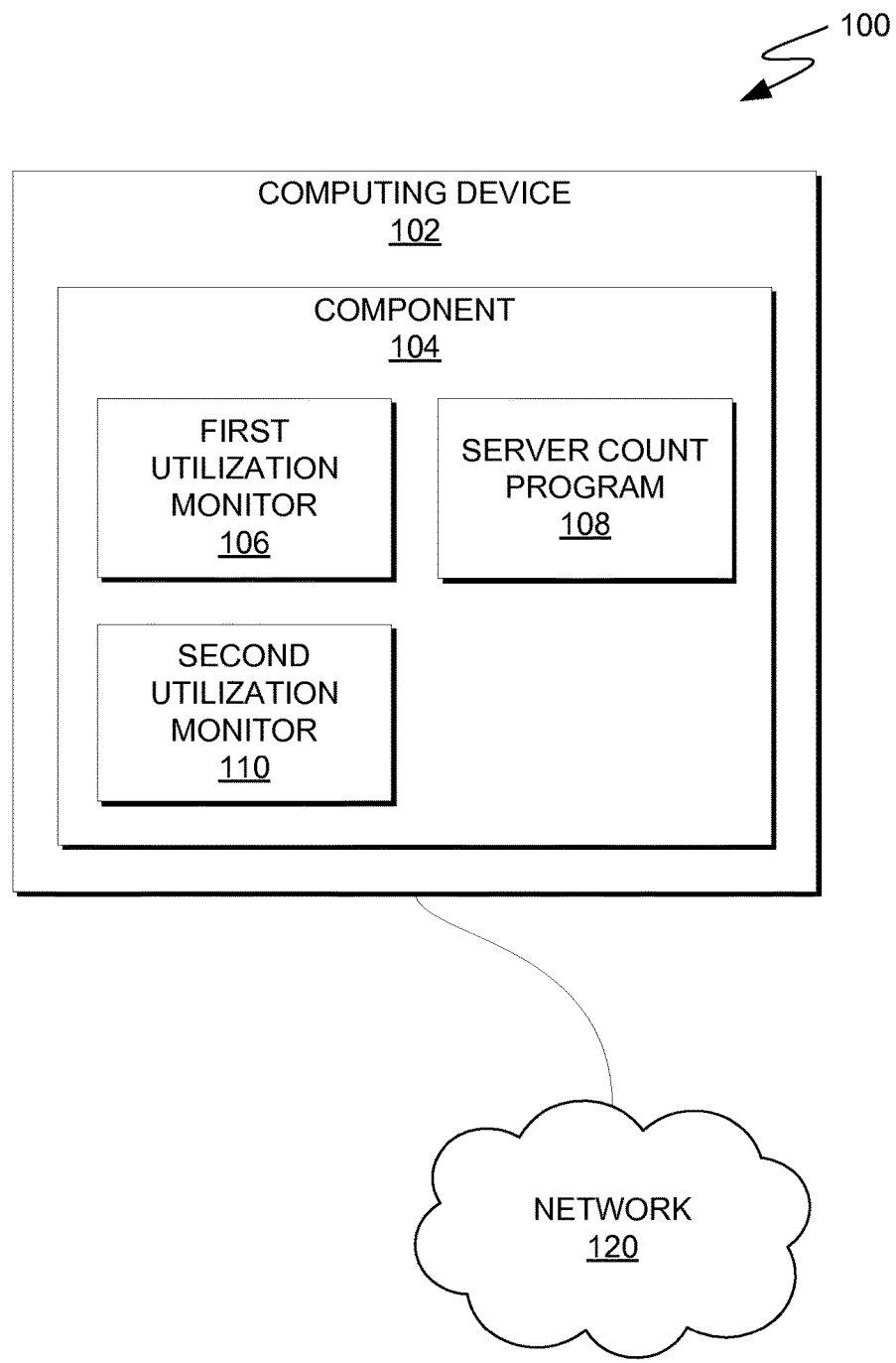
FIG. 1 is a functional block diagram illustrating a computing environment, in accordance with an embodiment of the present disclosure.

The present disclosure will now be described in detail with reference to the Figures. FIG. 1 is a functional block diagram illustrating a computing environment, in accordance with an embodiment of the present disclosure. For example, FIG. 1 is a functional block diagram illustrating computing environment 100. Computing environment 100 includes computing device 102 connected to network 120. Computing device 102 includes component 104. Component 104 includes first utilization monitor 106, server count program 108, and second utilization monitor 110.

In various embodiments of the present invention, computing device 102 is a computing device that can be a standalone device, a server, a laptop computer, a tablet computer, a netbook computer, a personal computer (PC), or a desktop computer. In another embodiment, computing device 102 represents a computing system utilizing clustered computers and components to act as a single pool of seamless resources. In general, computing device 102 can be any computing device or a combination of devices with access to and capable of executing first utilization monitor 106, server count program 108, second utilization monitor 110. Computing device 102 may include internal and external hardware components, as depicted and described in further detail with respect to FIG. 5.

In this exemplary embodiment, first utilization monitor 106, server count program 108, and second utilization monitor 110 are stored on computing device 102. In one embodiment, first utilization monitor 106, server count program 108, and second utilization monitor 110 each reside within a memory of an embedded processor of component 104. In other embodiments, one or more of first utilization monitor 106, server count program 108, and second utilization monitor 110 may reside on another computing device, provided that each can access and is accessible by component 104. In yet other embodiments, one or more of first utilization monitor 106, server count program 108, and second utilization monitor 110 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications with computing device 102, in accordance with a desired embodiment of the present invention.

In this example embodiment, component 104 is a hardware component of computing device 102. In one embodiment, component 104 includes at least one server. Component 104 processes a request by assigning the request to a server, which provides service. In one embodiment, a queue forms when the quantity of requests accumulate faster than they can be serviced by a server of component 104. In one example, component 104 is a network adapter with a plurality of ports (i.e., servers) that processes packets (i.e., requests). In some embodiments, each of first utilization monitor 106, server count program 108, and second utilization monitor 110 provide a process that is broadly applicable to monitor the utilization of any system for which the needed measurements (e.g., a server count a count of outstanding requests, measures of response times, etc.) can be performed, by applying queueing theory to that system's observed response to requests.

First utilization monitor 106 operates to monitor the utilization of a component. In one embodiment, first utilization monitor 106 determines initial boundary values based, in part, on a value of c, which represents a count of the number of service channels (or servers) of the component. The count of service channels is a measure of a level of concurrency, which is capacity (e.g., of a device) to process operations concurrently. First utilization monitor 106 determines candidate boundary values based on either the initial candidate boundary values or the candidate boundary values of a previous iteration of first utilization monitor 106 (see decision 214 and operation 204). In one embodiment, first utilization monitor 106 determines whether to update the candidate boundary values based, in part, on specified criteria. In this case, if first utilization monitor 106 determines that the candidate boundary values do not meet the specified criteria, then first utilization monitor 106 updates the candidate boundary values one or more times. Further, if first utilization monitor 106 determines that the candidate boundary values do meet the specified criteria, then first utilization monitor 106 determines boundary values based on the candidate boundary values. First utilization monitor 106 determines an estimated utilization value. First utilization monitor 106 determines whether the value of c has changed. If first utilization monitor 106 determines that the value of c has changed, then first utilization monitor 106 returns to determine initial boundary values. If first utilization monitor 106 determines that the value of c has not changed, then first utilization monitor 106 returns to determine candidate boundary values.

Server count program 108 operates to estimate a count of servers of a component. In one embodiment, server count program 108 determines an initial server count. Server count program 108 determines an overall average response time. Server count program 108 determines an average response time per operation requested during conditions of minimal interference. Server count program 108 determines a tipping point based on the server count. The tipping point is a level of utilization at which the probability of a new request or operation being queued approximately equals the probability of being assigned immediately to a server. Server count program 108 determines a response time ratio. Server count program 108 updates the server count. In some embodiments, server count program 108 repeatedly determines the tipping point and the response time ratio, and server count program 108 repeatedly updates the server count. Embodiments of the present disclosure provide various examples of operations that approximate the value of the tipping point.

Second utilization monitor 110 operates to monitor the utilization of a component. In one embodiment, second utilization monitor 110 initially determines boundary values, which define a numerical range between a lower boundary value and an upper boundary value. Second utilization monitor 110 determines whether N is within bounds (i.e., within the boundary values). For example, the value N represents the average number of outstanding requests to the component (e.g., component 104) during a measurement interval. In this embodiment, if second utilization monitor 110 determines that N is within the boundary values, then second utilization monitor 110 partitions the boundaries. If second utilization monitor 110 determines that N is below the boundary values, then second utilization monitor 110 shifts the boundaries of N down. If second utilization monitor 110 determines that N is above the boundary values, then second utilization monitor 110 shifts the boundaries of N up. Second utilization monitor 110 determines whether N is within bounds (i.e., within the boundary values). If second utilization monitor 110 determines that N is within bounds, then second utilization monitor 110 partitions the numerical range defined by the boundary values and narrows the boundaries based on the partitions. Second utilization monitor 110 estimates the utilization value U. For example, U represents a level of utilization of a component (e.g., component 104).

In some embodiments, one or more of first utilization monitor 106, server count program 108, and second utilization monitor 110 are modules of a master program (not shown). For example, the master program receives a selection from a user (e.g., a user of client device 102) that identifies a module and, in response, executes the identified module. In one embodiment, the master program operates to estimate the average utilization of a component by utilizing one or more of the modules. For example, the master program estimates the average utilization of component 104 by executing second utilization monitor 110, using a number of servers of component 104 estimated by executing server count program 108. In another embodiment, the master program provides a recommendation to a user as to whether to estimate the average utilization of a component using first utilization monitor 106 or second utilization monitor 110. In one example, the master program provides a recommendation to use the first utilization monitor 106 in response to the master program determining that c is known, such as when c is provided by a user or when c is otherwise pre-determined. In another example, the master program provides a recommendation to use the second utilization monitor 110 in response to the master program predicting that c is likely to change in the future. The master program predicts that c is likely to change based, for example, on the value of c having previously changed with a frequency above a pre-determined threshold. In this example, the master program also provides a recommendation to the user to use server count program 108 to determine the value of c for use by second utilization monitor 110.

Figure 2:
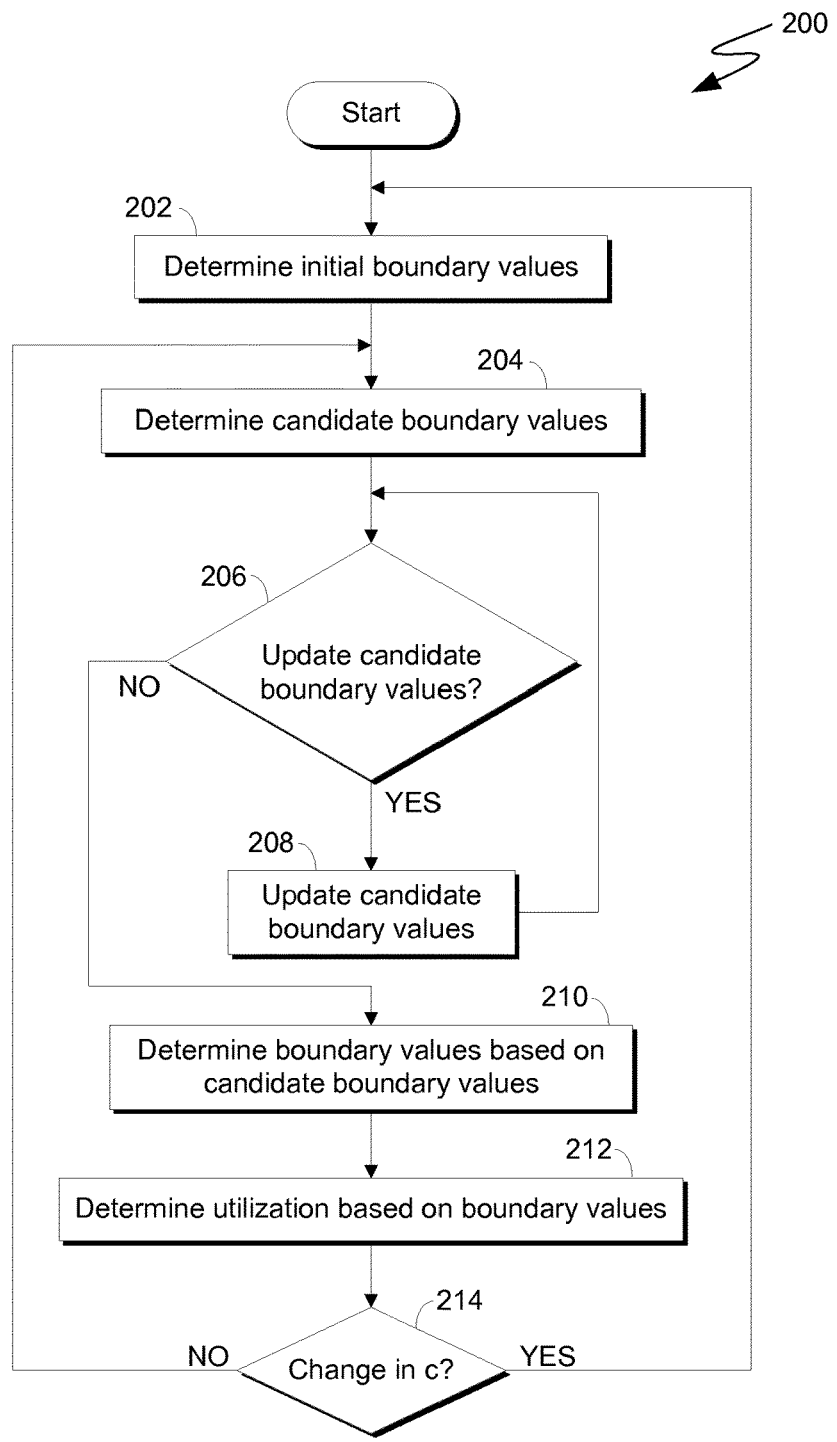
FIG. 2 is a flowchart depicting operations for utilization monitoring, on a computing device within the computing environment of FIG. 1, in accordance with an embodiment of the present disclosure.

FIG. 2 is a flowchart depicting operations for device utilization monitoring, on a computing device within the computing environment of FIG. 1, in accordance with an embodiment of the present disclosure. For example, FIG. 2 is a flowchart depicting operations 200 of first utilization monitor 106, on computing device 102 within computing environment 100.

In some embodiments, first utilization monitor 106 repeatedly performs a numeric search for a numerical region within which a utilization metric is located. First utilization monitor 106 interpolates the value of the utilization metric based on the boundaries of the region. First utilization monitor 106 performs the numeric search and interpolation with reduced computational complexity compared to algorithms that rely more heavily on exponential and logarithmic functions. In one embodiment, the functionality of first utilization monitor 106 is implemented by an embedded processor, which thereby determines a level of utilization of a component in which the processor is embedded.

In operation 202, first utilization monitor 106 determines initial boundary values. In one embodiment, first utilization monitor 106 determines the value of $B_{init}$, $T_{init}$, $X_{init}$, and $Y_{init}$. First utilization monitor 106 sets $Y_{init}$ to the value of a pre-determined value (e.g., 0.95) and sets $T_{init}$ according to formula 1.

$$T_{init} = 1 - \frac{0.05}{c} - 0.5 * 0.05^2 * \frac{c-1}{c^2} - \frac{1}{6} * 0.05^3 * (c-1) * (2c-1)/c^3 \qquad \text{Formula 1}$$

In this embodiment, first utilization monitor 106 sets $B_{init}$ to the value of $T_{init}$, and sets $X_{init}$ to the value of $Y_{init}$. First utilization monitor 106 squares the values of $B_{init}$ and $X_{init}$ one or more times until $B_{init}$ is less than 0.1. Thus, in this embodiment, at the conclusion of operation 202, $B_{init}$ is a small value relative to $T_{init}$. Further, due to the operation of Formula 1 and the values determined above, $X_{init}$ equals $B_{init}$ to the power of c and $Y_{init}$ equals $T_{init}$ to the power of c. In one embodiment, the operations of first utilization monitor 106 maintain these relationships. For example, because $B_{init}$ and $X_{init}$ are squared the same number of times in operation 202, the relationship of $X_{init}$ to $B_{init}$ remains the same (i.e., $X_{init}$ remains equal to the value of $B_{init}$ to the power of c).

In operation 204, first utilization monitor 106 determines candidate boundary values. The candidate boundary values include a value of $B_j$, $Y_j$, $T_j$, and $X_j$, where j equals zero. In one embodiment, each candidate boundary value is based on a corresponding initial value. For example, on a first iteration after initialization (see operation 202), $B_0$ is set to $B_{init}$, $Y_0$ is set to $Y_{init}$, $T_0$ is set to $T_{init}$, and $X_0$ is set to $X_{init}$. In another embodiment, each candidate boundary value is based on a corresponding value of a previous measurement interval. For example, on a subsequent iteration (e.g., after decision 214, NO branch), $B_0$ is set to $B_{last}$, $Y_0$ is set to $Y_{last}$, $T_0$ is set to $T_{last}$, and $X_0$ is set to $X_{last}$, where each of $B_{last}$, $Y_{last}$, $T_{last}$, and $X_{last}$ are determined during the subsequent iteration, as is explained in further detail below.

In decision 206, first utilization monitor 106 determines whether to update the candidate boundary values. In one embodiment, first utilization monitor 106 determines whether to update the candidate boundary values based on a comparison of the lower candidate boundary values (e.g., $B_j$ and $X_j$) to the upper candidate boundary values (e.g., $T_j$ and $Y_j$). In one embodiment, first utilization monitor 106 compares the lower and upper candidate boundary values according to Formula 2, as follows:

$$\frac{(1-X_j)^2}{1+(c-1)*X_j} <= D * \frac{(1-Y_j)^2}{1+(c-1)*Y_j} \qquad \text{Formula 2}$$

In Formula 2, the value D is a constant that represents a threshold degree of difference between the lower boundary and the upper boundary. For example, D equals 1.1, representing a ten percent threshold. In this case, Formula 2 evaluates as true if the lower boundary and upper boundary are within ten percent of one another. In this embodiment, first utilization monitor 106 determines whether to update the candidate boundary values based on whether Formula 2 evaluates as true. If Formula 2 evaluates as true, then first utilization monitor 106 determines not to update the candidate boundary values (decision 206, NO branch). In this case, first utilization monitor 106 determines boundary values based on the candidate boundary values (operation 210). If first utilization monitor 106 evaluates Formula 2 as false, then first utilization monitor 106 determines to update the candidate boundary values (decision 206, YES branch). In this case, first utilization monitor 106 updates the candidate boundary values (operation 208).

In operation 208, first utilization monitor 106 updates the candidate boundary values. First utilization monitor 106 increments the value of j by one. In one embodiment, first utilization monitor 106 updates the candidate boundary values based on a comparison of a value of U (i.e., the level of utilization) to the candidate boundary values. Even when an exact value of U is unavailable, first utilization monitor 106 can determine whether the value of U is greater than or less than a guessed value, represented by G. To do so, first utilization monitor 106 evaluates the following Formula 3 using G to determine N' and compares N' to the measured value of N, which is a value representing the average number of outstanding requests to component 104 during a measurement interval. If G equals U, then the value of N' given by Formula 3 equals N. Embodiments provide that the relationship between U and N is strictly monotonic. Therefore, first utilization monitor 106 uses Formula 3 to determine whether a given value of G is greater than, equal to, or less than the value of U based on whether the value of N' resulting from Formula 3 using the given value of G is greater than, equal to, or less than the measured value of N, respectively.

$$N' = \frac{c*G}{1-G^c} \qquad \text{Formula 3}$$

First utilization monitor 106 obtains the value of N by, for example, sampling the number of outstanding requests of component 104 at one or more points in time and determining an average. First utilization monitor 106 evaluates Formula 3, where G equals $B_{j-1}$. If N' is greater than N (i.e., the measured value of N), then the value of U is less than the value of $B_{j-1}$, which means that the lower candidate boundary value is not low enough to encompass the value of U (i.e., U is below the range of the candidate boundary values). In this case, first utilization monitor 106 decreases the lower candidate boundary value. If N' is less than N, then the value of U is greater than the value of the lower candidate boundary value. As is explained in further detail below, first utilization monitor 106 either increases the upper candidate boundary value or tightens the candidate boundary values, depending on the value of N' where G equals the upper candidate boundary value, $T_{j-1}$.

In one embodiment, first utilization monitor 106 decreases the lower candidate boundary value by setting $T_j$ to $T_{j-1}$ and setting $B_j$ to $B_{j-1}*(B_{j-1}/T_{j-1})$. Similarly, in this case, first utilization monitor 106 sets $Y_j$ to $Y_{j-1}$ and sets $X_j$ to $X_{j-1}*(X_{j-1}/Y_{j-1})$.

In some embodiments, rather than decreasing the lower candidate boundary value below $B_{init}$, first utilization monitor 106 estimates the utilization by evaluating the Formula 4, where $N_0$ is the value of N' where G equals $B_{init}$ and $S_0$ equals $(1-X_{init})^2/(c+c*(c-1)*X_{init})$:

$$U = \min\left(\frac{N}{c}, B_{init} + (N - N_0)*S_0\right) \qquad \text{Formula 4}$$

As explained previously, if first utilization monitor 106 determines that N' is less than N where G equals $B_{j-1}$, then first utilization monitor 106 determines whether to increase the upper candidate boundary value or tighten the candidate boundary values. First utilization monitor 106 evaluates Formula 3, letting G equal $T_{j-1}$. If the result is greater than the value of N, then the value of U is greater than the value of $T_{j-1}$, which means that the upper candidate boundary value is not high enough to encompass the value of U (i.e., N is above the range of the candidate boundary values). In this case, first utilization monitor 106 increases the upper candidate boundary values. If the result is less than the value of N, then the value of U is less than the value of the upper candidate boundary value.

In one embodiment, first utilization monitor 106 increases the upper candidate boundary values by setting $B_j$ to $B_{j-1}$ and setting $T_j$ to $T_{j-1}*(T_{j-1}/B_{j-1})$. Similarly, in this case, first utilization monitor 106 sets $X_j$ to $X_{j-1}$ and sets $Y_j$ to $Y_{j-1}*(Y_{j-1}/X_{j-1})$.

In some embodiments, rather than increasing the upper candidate boundary values above $T_{init}$, first utilization monitor 106 estimates the utilization by evaluating Formula 5, where $N_1$ is the value of N' where G equals $T_{init}$ and $S_1$ equals $(1-Y_{init})^2/(c+c*(c-1)*Y)$:

$$U = \min\left(\frac{N}{N+1}, T_{init} + (N - N_1)*S_1\right) \qquad \text{Formula 5}$$

If first utilization monitor 106 determines that N' where G equals $B_{j-1}$ is less than N and N' where G equals $T_{j-1}$ is greater than N, then first utilization monitor 106 determines that the value of U falls within the candidate boundary values. In this case, first utilization monitor 106 tightens the candidate boundary values.

In one embodiment, first utilization monitor 106 tightens the candidate boundary values by subdividing the region between the candidate boundary values into two regions by introducing an intermediate boundary value equal to $\sqrt{(B_{j-1}*T_{j-1})}$. In this case, first utilization monitor 106 evaluates Formula 3 where G equals the intermediate boundary value and compares the resulting value of N' to N, thereby determining whether G is greater than, less than, or equal to U. In evaluating Formula 3, $G^c$ equals $\sqrt{(X_{j-1}*Y_{j-1})}$. If G is greater than U (i.e., if N' is greater than N), then first utilization monitor 106 sets the value of $Y_j$ to $\sqrt{(X_{j-1}*Y_{j-1})}$ and sets the value of $T_j$ to G. If G is less than U (i.e., if N' is less than N), then first utilization monitor 106 sets the value of $X_j$ to $\sqrt{(X_{j-1} * Y_{j-1})}$ and sets the value of $B_j$ to G. In one embodiment, if G is equal to U (i.e., if N' is equal to N), then first utilization monitor 106 operates as though G is less than U (or, alternatively, as though G is greater than U). In another embodiment, if G is equal to U (i.e., if N' is equal to N), then first utilization monitor 106 determines boundary values based on $X_j$, $Y_j$, $T_j$, and $B_j$ (see operation 210), and determines the utilization as the value of U (which also equals G) (see operation 212).

In one embodiment, after updating the candidate boundary values, first utilization monitor 106 determines whether to update the candidate boundary values again (decision 206).

In operation 210, first utilization monitor 106 determines boundary values based on the candidate boundary values. First utilization monitor 106 sets the value of $B_{last}$ to that of $B_j$, the value of $Y_{last}$ to that of $Y_j$, the value of $T_{last}$ to that of $T_j$, and the value of $X_{last}$ to that of $X_j$.

In operation 212, first utilization monitor 106 determines utilization based on the boundary values. First utilization monitor 106 determines the utilization by interpolating the value of U based on the values of $B_j$, $Y_j$, $T_j$, and $X_j$. In one embodiment, first utilization monitor 106 interpolates the value of U by linear interpolation, such as by the following formula, in which $N_T$ is the value of N' as determined by Formula 3, where G equals $T_j$ and $N_B$ is the value of N' as determined by Formula 3, where G equals $B_j$:

$$U = B_j * \frac{N_T - N}{N_T - N_B} + T_j * \frac{N - N_B}{N_T - N_B} \qquad \text{Formula 6}$$

In some embodiments, first utilization monitor 106 reports the value of U. In various embodiments, first utilization monitor 106 reports the utilization (i.e., U) by sending U to a processor (e.g., processor(s) 502), by storing U (e.g., to persistent storage 508), by providing U to computing device 102, by providing U to a user (e.g., a user of computing device 102, via a user interface), or by providing U to another computing device (e.g., via network 120). For example, first utilization monitor 106 initiates operation in response to receiving an instruction from computing device 102 that identifies a reporting destination, in which case, first utilization monitor 106 reports the value of U to the identified destination.

In decision 214, first utilization monitor 106 determines whether the value of c has changed since determining the initial boundary values (operation 202). If first utilization monitor 106 determines that the value of c has changed (decision 214, YES branch), then first utilization monitor 106 determines the initial boundary values based on the changed value of c (operation 202). If first utilization monitor 106 determines that the value of c has not changed (decision 214, NO branch), then first utilization monitor 106 determines candidate boundary values based on the boundary values determined in operation 210 (operation 204).

A measurement interval begins based on first utilization monitor 106 determining candidate boundary values (operation 204). The measurement interval ends based on first utilization monitor 106 determining whether the value of c has changed (operation 202). In one example, a first measurement interval ends based on first utilization monitor 106 determining that the value of c has not changed (decision 214, NO branch). In this case, a second measurement interval begins and first utilization monitor 106 determines candidate boundary values (operation 204). The candidate boundary values of the second measurement interval are based on the candidate boundary values of the first measurement interval.

Figure 3:
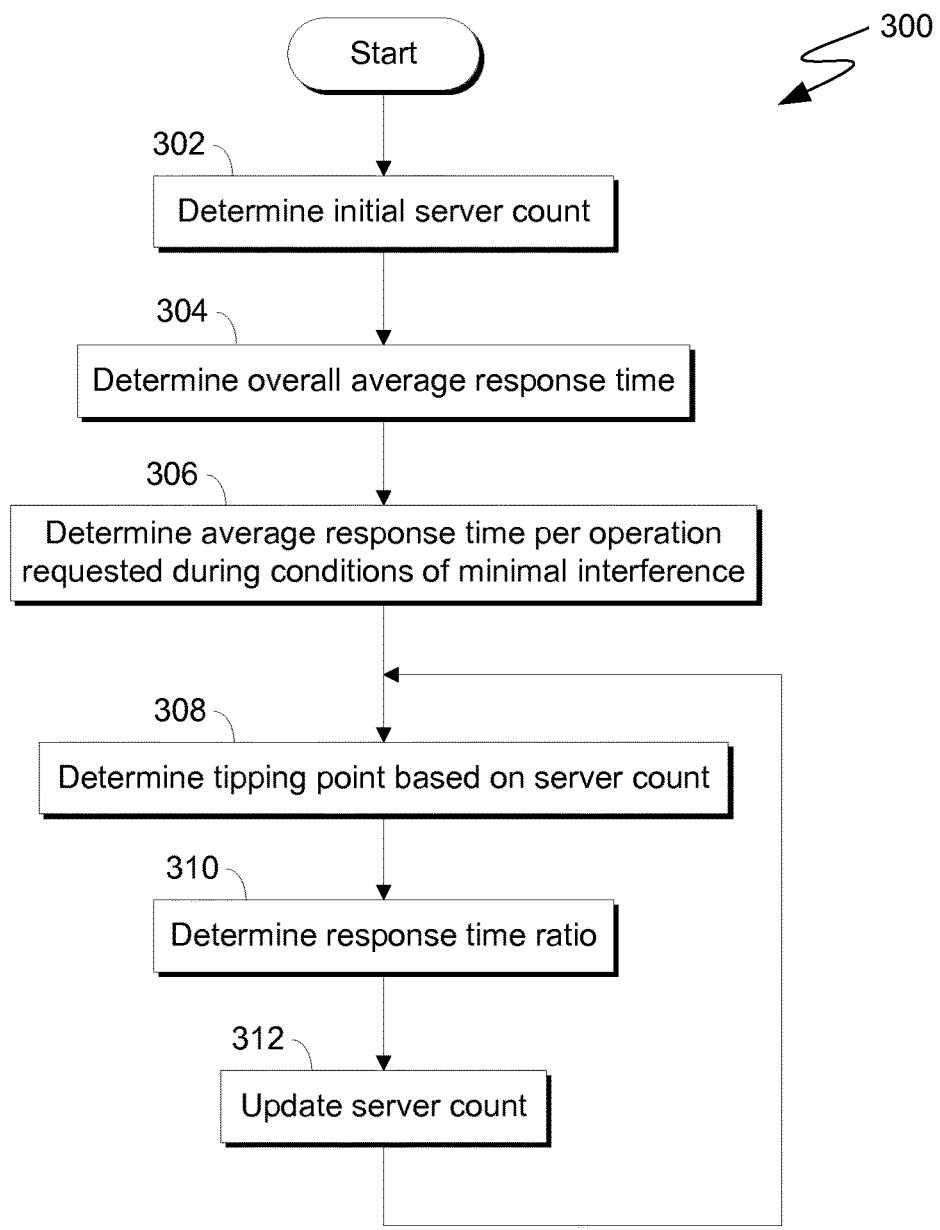
FIG. 3 is a flowchart depicting operations for utilization monitoring, on a computing device within the computing environment of FIG. 1, in accordance with an embodiment of the present disclosure.

FIG. 3 is a flowchart depicting operations for device utilization monitoring, on a computing device within the computing environment of FIG. 1, in accordance with an embodiment of the present disclosure. For example, FIG. 3 is a flowchart depicting operations 300 of server count program 108, on computing device 102 within computing environment 100.

In some embodiments, the value of c, which represents a count of the servers of component 104, is not pre-determined. In one such embodiment, server count program 108 operates to determine the value of c based, in part, on a response time ratio. As explained in further detail below, the response time ratio is the ratio of the average response time per operation launched under conditions of minimal interference and the overall average response time per operation. In some embodiments, server count program 108 is used to determine the value of c for use with first utilization monitor 106, second utilization monitor 110, or both.

In operation 302, server count program 108 determines an initial server count. The server count is represented by a value of c. In one embodiment, server count program 108 initially sets the value of c to an integer equal to an estimated maximum number of servers. For example, in the case of a network adapter, server count program 108 sets the initial value of c to the number of ports of the network adapter. In various other examples, server count program 108 sets the initial value of c to a pre-configured value (e.g., one), a value provided via user input, or to an unrealistically high value (e.g., in the case of a network adapter with four ports, a value of five hundred).

In operation 304, server count program 108 determines an overall average response time. The overall average response time is represented by R. In one embodiment, server count program 108 measures the overall response time of one or more requests made to component 104. Server count program 108 averages the measured overall response times to determine R.

In operation 306, server count program 108 determines an average response time per operation requested during conditions of minimal interference. The average response time per such operation is represented by RMI. In one embodiment, conditions of minimal interference are conditions occurring when the current number of outstanding requests (N) is less than or equal to the value of c−1. In one embodiment, server count program 108 determines that the number of outstanding requests is less than or equal to the value of c−1 and, in response, measures the response time per operation of one or more requests made to component 104. Server count program 108 averages the measured response time per operation to determine RMI.

In operation 308, server count program 108 determines a tipping point based on the server count. As before, the tipping point is represented by $U_{tip}$ and the server count is represented by c. In one embodiment, c is estimated by an initial estimation (see operation 302), for example, during a first iteration of server count program 108. In another embodiment, c is estimated by a previous iteration of some or all of operations 300 by server count program 108 (see operation 312). In one embodiment, c is greater than or equal to one and is a multiple of a value by which server count program 108 increments or decrements the value of c (see operation 312). For example, c is a multiple of ⅛ that is greater than or equal to one.

In one embodiment, server count program 108 determines the tipping point ($U_{tip}$) using harmonic numbers. A harmonic number is the sum of the reciprocals of a series of integers. This summation is defined further by Formula 7, below, as signified by the sigma operator.

$$H_m = \sum_{a=1}^{m} \frac{1}{a}$$ Formula 7

In this embodiment, if server count program 108 determines that c equals one, then server count program 108 determines that $U_{tip}$ is ½. If server count program 108 determines that c does not equal one, then server count program 108 determines whether c is an integer. If server count program 108 determines that c is an integer, then server count program 108 determines the harmonic value of c, H(c), according to Formula 8, below, wherein the value of $H_c$ is defined by Formula 7 where m equals c.

$$H(c) = H_c$$ Formula 8

Continuing this embodiment, if server count program 108 determines that c is not an integer, then server count program 108 determines whether c is a multiple of ½. If server count program 108 determines that c is a multiple of ½ (other than an integer), then server count program 108 determines the harmonic value of c according to Formula 9, below. Formula 9 is a recursive function. That is, Formula 9 includes the term H(c+½), which is the harmonic value of c+½. In evaluating Formula 9, server count program 108 recursively evaluates the harmonic value of c+½. Thus, the harmonic value of c is, in this case, the harmonic value of c+½ less 1/(2c+1.52).

$$H(c) = H\left(c + \frac{1}{2}\right) - \frac{1}{2c + 1.52}$$ Formula 9

Continuing this embodiment, if server count program 108 determines that c is not a multiple of ½, then server count program 108 determines whether c is a multiple of ¼. If server count program 108 determines that c is a multiple of ¼ (other than a multiple of ½), then server count program 108 determines the harmonic value of c according to Formula 10, below. Formula 10 is a recursive function. That is, Formula 10 includes the term H(c+¼), which is the harmonic value of c+¼. In evaluating Formula 10, server count program 108 recursively evaluates the harmonic value of c+¼. Thus, in Formula 10, the harmonic value of c is, in this case, the harmonic value of c+¼ less 1/(4c+2.52).

$$H(c) = H\left(c + \frac{1}{4}\right) - \frac{1}{4c + 2.52}$$ Formula 10

Continuing this embodiment, if server count program 108 determines that c is not a multiple of ¼, then server count program 108 determines that c is a multiple of ⅛ (other than a multiple of ¼). Server count program 108 determines the harmonic value of c according to Formula 11, below. Formula 11 is a recursive function. That is, Formula 11 includes the term H(c+⅛), which is the harmonic value of c+⅛. In evaluating Formula 11, server count program 108 recursively evaluates the harmonic value of c+⅛. Thus, in Formula 10, the harmonic value of c is, in this case, the harmonic value of c+⅛ less 1/(8c+4.6).

$$H(c) = H\left(c + \frac{1}{8}\right) - \frac{1}{8c + 4.6}$$ Formula 11

Continuing this embodiment, server count program 108 determines the value of $U_{tip}$ according to Formula 12, below. Server count program 108 applies one or more of Formulas 7-11 to determine the value of H(c+1).

$$U_{tip} = 1 - \left(\frac{1}{c}\right) * (H(c+1) - 1) + \frac{0.4}{c+4} - \frac{0.8}{c+8.0} + \frac{0.1}{c+12.0}$$ Formula 12

For example, if c is 2.125, then server count program 108 determines that c is not equal to 1 and is not a multiple of 1, ½, or ¼, but is a multiple of ⅛. In this case, server count program 108 determines the harmonic value of c+1 in Formula 12 by determining the harmonic value of 2.25 (which is H(c+⅛); see Formula 11), which is calculated based on the harmonic value of 2.5 (which is H((c+⅛)+¼); see Formula 10), which is calculated based on the harmonic value of 3 (which is H(((c+⅛)+¼)+½); see Formula 9), which is calculated based on Formula 7. In other words, server count program 108 determines the harmonic value of c by the nested operation (i.e., recursion) of Formulas 7-11.

In another example, if c is 3.75, then server count program 108 determines that c is not equal to 1 and is not a multiple of 1 or ½, but is a multiple of ¼. In this case, server count program 108 determines the harmonic value of c+1 in Formula 12 by determining the harmonic value of 4 (which is H(c+¼); see Formula 10), which is calculated based on Formula 7. Various alternative and additional embodiments for determining the value of $U_{tip}$ follow the discussion of FIG. 3.

In some embodiments, server count program 108 continues by the above pattern to levels beyond ⅛. For example, server count program 108 continues to determine whether c is a multiple of increasingly small values, such as ¹⁄₁₆, ¹⁄₃₂, or ¹⁄₆₄.

In operation 310, server count program 108 determines a response time ratio. In one embodiment, server count program 108 determines the response time ratio, represented by M, as RMI divided by R. In one embodiment, U and M are inversely correlated to one another. For example, when U is greater than $U_{tip}$, M is expected to be less than c/(c+1). If the value of c is correct (i.e., if c equals the actual server count) and U equals $U_{tip}$, then M is expected to be equal to c/(c+1).

In operation 312, server count program 108 updates the server count. In one embodiment, server count program 108 updates the server count by incrementing, decrementing, or maintaining the value of c. In one embodiment, server count program 108 determines whether to increment, decrement, or maintain the value of c based on a comparison of N to the value of (c+1)*$U_{tip}$, and a comparison of M to c. For example, if N is less than (c+1)*$U_{tip}$ and M is less than c/(c+1), then server count program 108 determines to decrement c. If N is greater than (c+1)*$U_{tip}$ and M is greater than c/(c+1), then server count program 108 determines to increment c. If server count program 108 neither determines to decrement c nor determines to increment c, then server count program 108 maintains the value of c.

In some embodiments, server count program 108 increments or decrements the value of c by a quantity of predetermined size (e.g., ⅛). In some embodiments, after server count program 108 updates the value of c, server count program 108 returns to determining the tipping point ($U_{tip}$) based on the updated server count (c) (see operation 308). In some embodiments, server count program 108 performs the operations of determining the tipping point (operation 308), determining the response time ratio (operation 310), and updating the server count (operation 312) periodically. For example, server count program 108 performs the operations on a regular schedule, such as once per minute. In another example, server count program 108 performs the operations with a frequency based on a measurement interval, such as a measurement interval used for performance reporting. In some embodiments, server count program 108 performs the operations one or more times. For example, server count program 108 performs the operations repeatedly until server count program 108 neither determines to decrement c nor determines to increment c (operation 312) and, in response, server count program 108 maintains the value of c.

In some embodiments, server count program 108 reports the value of c. In various embodiments, server count program 108 reports the server count (i.e., c) by sending c to a processor (e.g., processor(s) 502), by storing c (e.g., to persistent storage 508), by providing c to computing device 102, by providing c to a user (e.g., a user of computing device 102, via a user interface), by providing c to another computing device (e.g., via network 120), or by providing c to another program (e.g., first utilization monitor 106, second utilization monitor 110, or both). For example, server count program 108 initiates operation in response to receiving an instruction from computing device 102 that identifies a reporting destination, in which case, server count program 108 reports the value of c to the identified destination. In another example, server count program 108 initiates operation in response to receiving an instruction from second utilization monitor 110, in which case, server count program 108 reports the value of c to second utilization monitor 110.

In some embodiments, the value of c can change over time. For example, server count program 108 may adjust the value of c (see operation 312). In some embodiments, server count program 108 determines a change in $U_{tip}$ in response to a change in the value of c. In one such embodiment, server count program 108 determines a new value of $U_{tip}$ based on a harmonic series (see Formula 7 and related discussion). For example, server count program 108 determines that c increases by one from c to c+1 (e.g., based on the number of servers increasing from two to three). In this case, server count program 108 determines the value of $H_{c+1}$ by adding the reciprocal value of the new value of c (i.e., 1/(c+1)) to the value of $H_m$ for the current value of c, rather than re-computing the entire harmonic series $H_m$. In some such embodiments, server count program 108 then determines $U_{tip}$ (see Formulas 7-12 and related discussion).

In some embodiments, if c is not an integer, then second utilization monitor 110 interpolates between two numbers adjacent to c. In various examples, the two adjacent numbers are multiples of 1, ½, ¼, or ⅛. In one such embodiment, second utilization monitor 110 determines the value of $U_{tip}$ by evaluating Formula 12 using each such adjacent number in place of c and performing a linear interpolation between the two results.

In some embodiments, rather than interpolating the value of $U_{tip}$ based on values adjacent to c, second utilization monitor 110 determines the value of c based on the numerical value nearest to c for which interpolation is not required (which is, in various examples, a multiple of 1, ½, ¼, or ⅛). For example, second utilization monitor 110 determines a value equal to the value of c rounded to the nearest ⅛ and determines the value of $U_{tip}$ according to Formulas 7-12, using such nearest numerical value.

In some embodiments, second utilization monitor 110 determines the value of $U_{tip}$ based on the values of k, r, and d. The value k represents the smallest (i.e., least) power of two that is no less than c+1. The value r represents the $k^{th}$ root of c+1. The value d represents the ratio (r−1)/r. In such embodiments, second utilization monitor 110 determines the value of $U_{tip}$ as equal to the series of the following Formula 12. In one embodiment, Formula 12 includes a pre-determined number of terms. For example, as depicted, Formula 12 includes terms of the first, second, and third order in d (i.e., terms where the quantities of d, $d^2$, and $d^3$ appear as factors). In another embodiment, Formula 12 is extended to include additional terms. For example, Formula 12 may be extended to include up to a fifth order in d, which also increases the precision of the calculation.

$$H(m) = 1 - d * \frac{k}{c} + \frac{1}{2}\frac{k}{c} * \left(\frac{k}{c} - 1\right) * d^2 - \qquad \text{Formula 12}$$
$$\frac{1}{2*3}\frac{k}{c} * \left(\frac{k}{c} - 1\right) * \left(\frac{k}{c} - 2\right) * d^3 + \ldots$$

Implementations of the various embodiments disclosed herein may utilize values of constants that vary slightly from those disclosed herein without rendering the implementations of the embodiments inoperable. For example, the constant 1.52 contained in Formula 9, above, can be substituted with values approximately equal thereto, such as values between 1.50 and 1.54. However, such a variation may impact the accuracy of the approximation yielded by the formula in question.

In an alternative embodiment, server count program 108 determines that the value of c is an integer greater than or equal to two and, in response, determines the value of $U_{tip}$ based on the following Formula 14:

$$U_{tip} = 1 - \frac{1}{c}\sum_{a=2}^{c+1} \frac{1}{a} \qquad \text{Formula 14}$$

In this alternative embodiment, if server count program 108 determines that c is not an integer, then server count program 108 determines the value of $U_{tip}$ based on an interpolation between the two closest adjacent integers to c. In this case, server count program 108 determines d to be the largest integer that is less than c. Server count program 108 determines $U_d$ by evaluating Formula 14 where c is d. Server count program 108 determines $U_{d+1}$ by evaluating Formula 14 where c is d+1. Server count program 108 interpolates the values of $U_{tip}$ by evaluating Formula 15, as follows:

$$U_{tip} = U_d + (U_{d+1} - U_d) * (c - d) \qquad \text{Formula 15}$$

Figure 4:
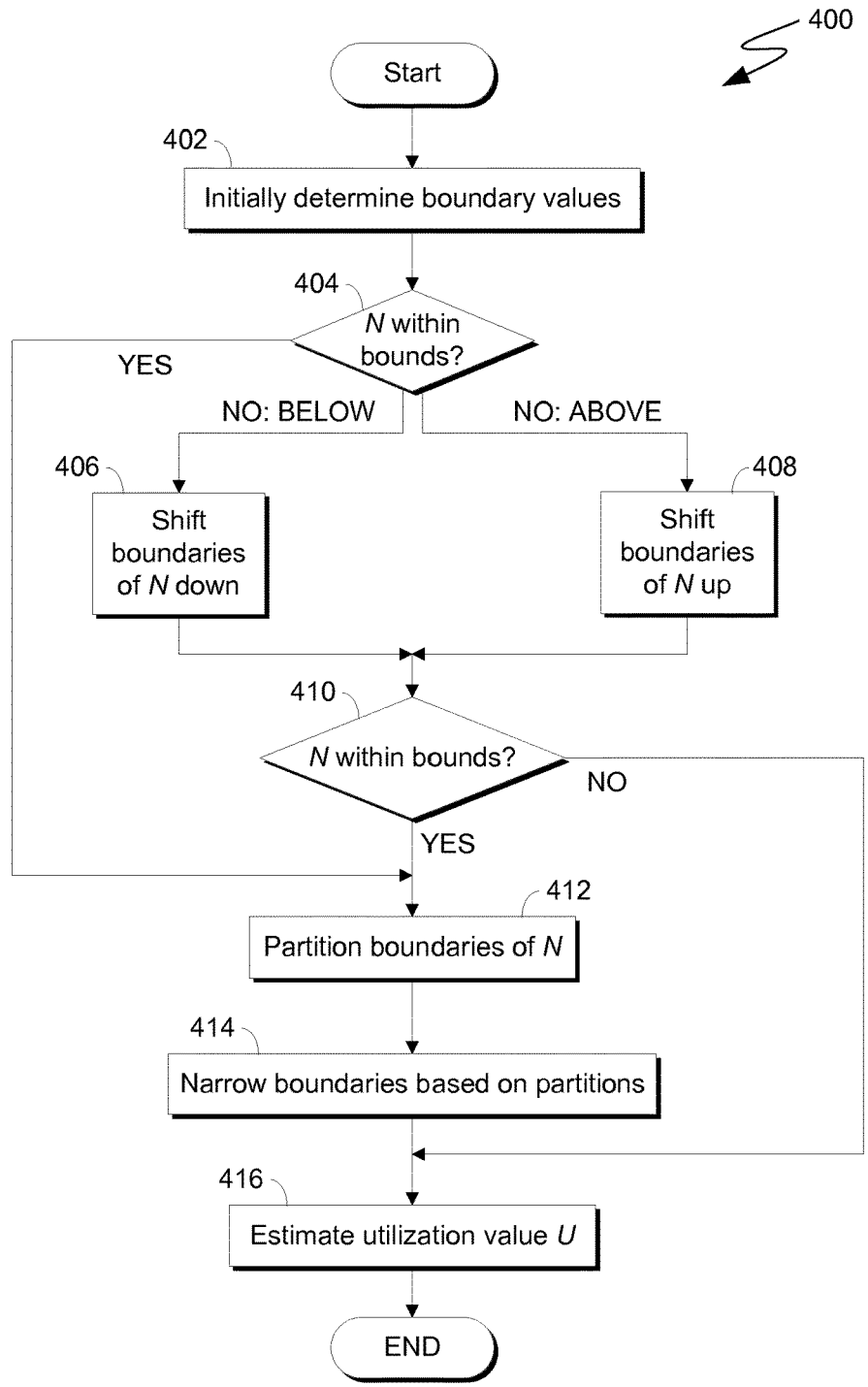
FIG. 4 is a flowchart depicting operations for utilization monitoring, on a computing device within the computing environment of FIG. 1, in accordance with an embodiment of the present disclosure.

FIG. 4 is a flowchart depicting operations for device utilization monitoring, on a computing device within the computing environment of FIG. 1, in accordance with an embodiment of the present disclosure. For example, FIG. 4 is a flowchart depicting operations 400 of second utilization monitor 110, on computing device 102 within computing environment 100.

In one embodiment, second utilization monitor 110 operates to estimate the value of U based, in part, on the value of N. The value N represents the average number of outstanding requests to the component (e.g., component 104) during a measurement interval. Second utilization monitor 110 obtains the value of N by, for example, sampling the number of outstanding requests of component 104 at one or more points in time and determining an average value.

In operation 402, second utilization monitor 110 initially determines boundary values. In one embodiment, second utilization monitor 110 assigns initial values to each of c, N, B, T, X, Y, $N_B$ and $N_T$. The value c represents a server count. In one embodiment, c is estimated. For example, c is estimated using server count program 108. In another embodiment, c is pre-determined. Second utilization monitor 110 sets c to the estimated (or pre-determined) server count. Second utilization monitor 110 sets N to the measured average number of outstanding requests to a component (e.g., component 104) during a measurement interval. The value B represents a lower boundary value for estimation of U.

Second utilization monitor 110 sets B to the value of $U_{tip}$. In one embodiment, second utilization monitor 110 determines the value of $U_{tip}$ as described above (see operation 308).

The value T represents an upper boundary value for estimation of U. Second utilization monitor 110 sets T to the square root of B. Second utilization monitor 110 sets X to the value equal to $1/(c+1)$. Second utilization monitor 110 sets Y to the square root of X. The value $N_B$ represents a lower boundary value for N. Second utilization monitor 110 sets $N_B$ to the value equal to $(c+1)*U_{tip}$. The value $N_T$ represents an upper boundary value for N. Second utilization monitor 110 sets $N_T$ to the value equal to $c*T/(1-Y)$. In one embodiment, the values of B, T, X, and Y are each between zero and one.

In decision 404, second utilization monitor 110 determines whether N is within bounds. In one embodiment, second utilization monitor 110 determines whether N is within bounds based on whether N is boundary values. For example, second utilization monitor 110 determines whether the measured number of requests (N) is between the lower boundary value for N, which is represented by $N_B$, and the upper boundary value of N, which is represented by $N_T$. In other words, second utilization monitor 110 determines that N is within bounds if the comparison $N_T \geq N \geq N_B$ is true. If N is less than $N_B$, then the measured number of requests is below both the upper and lower boundary values and N is therefore below bounds (decision 404, NO: BELOW branch). If N is greater than $N_T$, then the measured number of requests is above both the upper and lower boundary values and is therefore above bounds (decision 404, NO: ABOVE) branch). If second utilization monitor 110 determines that N is less than $N_B$ (decision 404, NO: BELOW branch), then second utilization monitor 110 shifts the boundaries of N down (operation 406). If second utilization monitor 110 determines that N is greater than $N_T$ (decision 404, NO: ABOVE branch), then second utilization monitor 110 shifts the boundaries of N up (operation 408). If second utilization monitor 110 determines that N is greater than or equal to $N_B$ and less than or equal to $N_T$ (decision 404, YES branch), then second utilization monitor 110 partitions the boundaries of N (operation 412).

In operation 406, second utilization monitor 110 shifts the boundaries of N down. In one embodiment, second utilization monitor 110 shifts the boundaries of N down once by setting T to B, setting Y to X, setting $N_T$ to $N_B$, setting B to $B^2$, setting X to $X^2$, and setting $N_B$ to $c*B/(1-X)$. In another embodiment, second utilization monitor 110 repeatedly performs these re-calculations of T, Y, $N_T$, B, X, and $N_B$ in order to repeatedly shift the boundaries of N down. In one example, second utilization monitor 110 shifts the boundaries of N down until a condition is met, such as until N is greater than or equal to $N_B$. In another example, second utilization monitor 110 shifts the boundaries of N down a pre-determined maximum number of times (e.g., three times) or until N is greater than or equal to $N_B$, whichever occurs first. In this example, increasing the pre-determined maximum number of repetitions also increases the precision of the calculation of U (see operation 416).

In operation 408, second utilization monitor 110 shifts the boundaries of N up. In one embodiment, second utilization monitor 110 shifts the boundaries of N up once by setting B to T, setting X to Y, setting $N_B$ to $N_T$, setting T to the square root of B, setting Y to the square root of X, and setting $N_T$ to $c*T/(1-Y)$. In another embodiment, second utilization monitor 110 repeatedly performs these re-calculations of B, X, $N_B$, T, Y, and $N_T$ in order to repeatedly shift the boundaries of N up. In one example, second utilization monitor 110 shifts the boundaries of N up until a condition is met, such as until N is less than or equal to $N_T$. In another example, second utilization monitor 110 shifts the boundaries of N up a pre-determined maximum number of times (e.g., three times) or until N is less than or equal to $N_T$, whichever occurs first. In this example, increasing the pre-determined maximum number of repetitions also increases the precision of the calculation of U (see operation 416).

In decision 410, second utilization monitor 110 determines whether N is within bounds. Second utilization monitor determines whether N is within bounds (decision 410) as described in connection with decision 404. Thus, in one embodiment, second utilization monitor 110 determines whether N is within bounds based on whether N is between boundary values. For example, second utilization monitor 110 determines whether the measured number of requests (N) is between $N_B$ and $N_T$. In other words, second utilization monitor 110 determines that N is within bounds if the comparison $N_T \geq N \geq N_B$ is true. If second utilization monitor 110 determines that N is within bounds (decision 410, YES branch), then second utilization monitor 110 partitions the boundaries of N (operation 412). If second utilization monitor 110 determines that N is not within bounds (decision 410, NO branch), then second utilization monitor 110 estimates the utilization of the component (operation 416).

In operation 412, second utilization monitor 110 partitions the boundaries of N. In one embodiment, second utilization monitor 110 partitions the boundaries defined by $N_B$ and $N_T$ by determining a middle boundary value. The middle boundary value is represented by $N_E$. In one embodiment, $N_E$ is a value between $N_B$ and $N_T$. In one embodiment, second utilization monitor 110 determines a value E to be $\sqrt{(B*T)}$. Second utilization monitor 110 determines a value Z to be $\sqrt{(X*Y)}$. Second utilization monitor 110 sets the value of $N_E$ to $c*E/(1-Z)$. In this embodiment, second utilization monitor 110 partitions the boundaries of N into a lower partition, defined by $N_B$ and $N_E$, and an upper partition, defined by $N_E$ and $N_T$.

In operation 414, second utilization monitor 110 narrows the boundaries based on the partitions. Second utilization monitor 110 narrows the boundaries of N to either the lower partition or the upper partition. In one embodiment, second utilization monitor 110 determines whether N is less than $N_E$. For example, second utilization monitor 110 evaluates Formula 3, where G equals E. If N is less than N', then N is less than $N_E$. In this embodiment, if second utilization monitor 110 determines that N is less than $N_E$, then second utilization monitor 110 narrows the boundaries of N to the lower partition by setting T to E, setting Y to Z, and setting $N_T$ to $N_E$. If second utilization monitor 110 determines that N is not less than $N_E$, then second utilization monitor 110 narrows the boundaries of N to the upper partition by setting B to E, setting X to Z, and setting $N_B$ to $N_E$.

In some embodiments, second utilization monitor 110 repeatedly partitions the boundaries of N (operation 412) and narrows the boundaries based on the partitions (operation 414) in order to repeatedly narrow the boundary values. For example, second utilization monitor 110 repeatedly narrows the boundary values a predetermined number of times (e.g., three times). Increasing the number of repetitions also increases the precision of the calculation of U (see operation 416).

In operation 416, second utilization monitor 110 determines the estimated utilization, U. In one embodiment, the utilization is the utilization of a component (e.g., component 104). Second utilization monitor 110 estimates U by determining the least of several values that are each calculated based on some or all of the values of N, c, T, B, X, and Y, according to the following Formula 16:

$$U = \min\left(\frac{N}{c}, \frac{N}{N+1}, B + (N - N_B) * \frac{(1-X)^2}{c + c*(c-1)*X}, \right.$$
$$\left. T + (N - N_T) * \frac{(1-Y)^2}{c + c*(c-1)*Y}\right) \quad \text{Formula 16}$$

In some embodiments, second utilization monitor 110 determines the estimated utilization utilizing Formula 4 when N is less than or equal to $N_B$, Formula 5 when N is greater than or equal to $N_T$ and Formula 6 when $N_T$ is greater than N and N is greater than $N_B$.

In some embodiments, second utilization monitor 110 reports the value of U. In various embodiments, second utilization monitor 110 reports the utilization (i.e., U) by sending U to a processor (e.g., processor(s) 502), by storing U (e.g., to persistent storage 508), by providing U to computing device 102, by providing U to a user (e.g., a user of computing device 102, via a user interface), or by providing U to another computing device (e.g., via network 120). For example, second utilization monitor 110 initiates operation in response to receiving an instruction from computing device 102 that identifies a reporting destination, in which case, second utilization monitor 110 reports the value of U to the identified destination.

Figure 5:
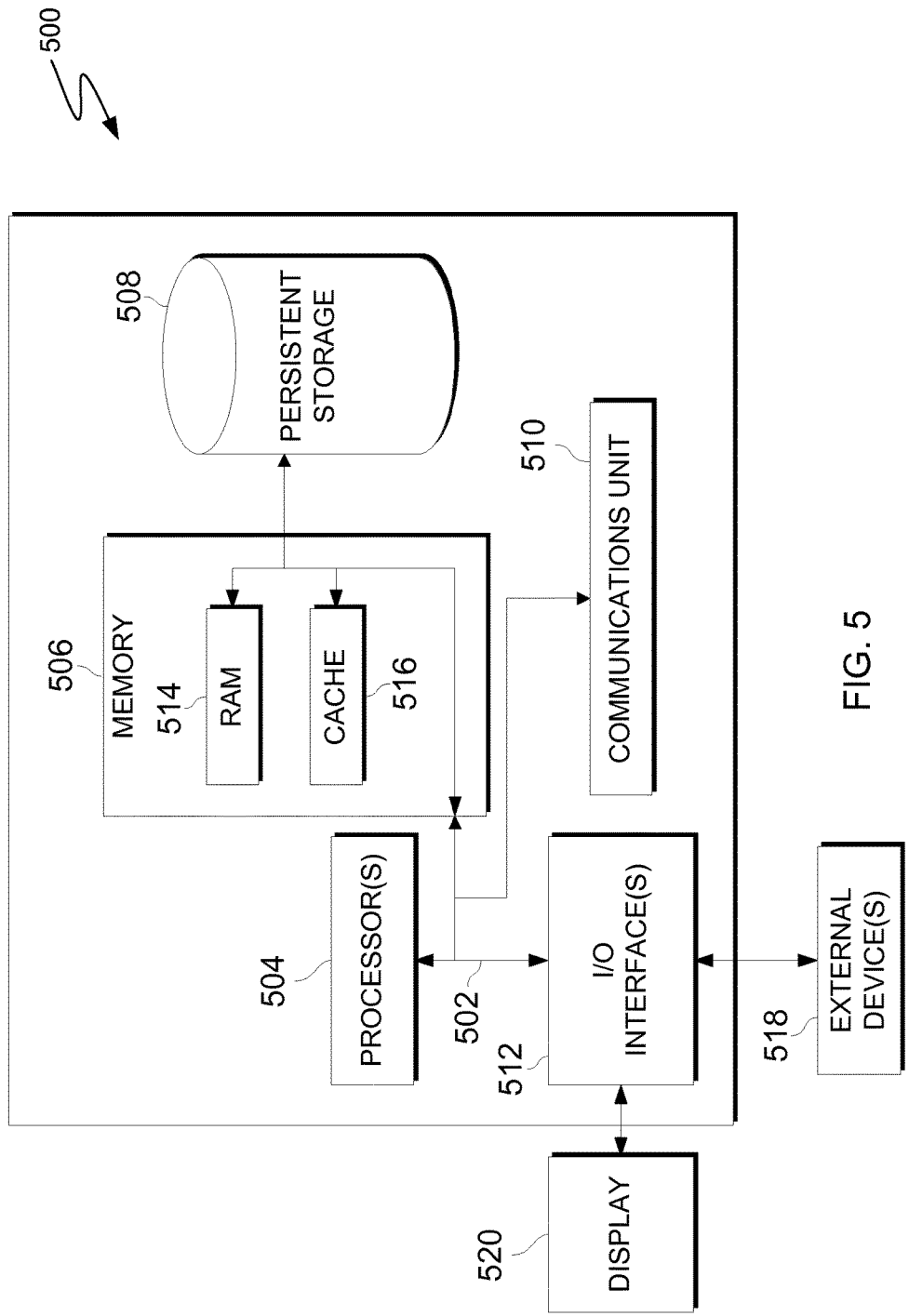
FIG. 5 is a block diagram of components of a computing device executing operations for utilization monitoring, in accordance with an embodiment of the present disclosure.

FIG. 5 is a block diagram of components of the computing device executing operations for utilization monitoring, in accordance with an embodiment of the present disclosure. For example, FIG. 5 is a block diagram of components 500 of computing device 102 within computing environment 100 executing operations of first utilization monitor 106, server count program 108, and second utilization monitor 110.

It should be appreciated that FIG. 5 provides only an illustration of one implementation and does not imply any limitations with regard to the environments in which different embodiments may be implemented. Many modifications to the depicted environment may be made.

Computing device 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Each of first utilization monitor 106, server count program 108, and second utilization monitor 110 is stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 120. In these examples, communications unit 510 includes one or more network interface cards. Communications unit 510 may provide communications through the use of either or both physical and wireless communications links. Each of first utilization monitor 106, server count program 108, and second utilization monitor 110 may be downloaded to persistent storage 508 through communications unit 510.

I/O interface(s) 512 allows for input and output of data with other devices that may be connected to computing device 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention (e.g., first utilization monitor 106, server count program 108, and second utilization monitor 110) can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for monitoring a level of utilization, the method comprising:
    determining, by one or more embedded processors of a device, a threshold based, at least in part, on a count of service channels of the device;
    determining, by one or more embedded processors of the device, an upper boundary value of a numerical range based, at least in part, on the count of service channels;
    determining, by one or more embedded processors of the device, a lower boundary value of the numerical range based, at least in part, on the threshold;
    determining, by one or more embedded processors of the device, whether a count of outstanding requests of the device is contained within the numerical range;
    determining, by one or more embedded processors of the device, an estimated level of utilization of the device based, at least in part, on the upper boundary value, the lower boundary value, the count of service channels, and the count of outstanding requests; and
    reporting, by one or more embedded processors of the device, the estimated level of utilization.

2. The method of claim 1, wherein determining the threshold is further based on a harmonic number of a value based on the count of service channels.

3. The method of claim 2, wherein determining the threshold further comprises:
    determining, by one or more embedded processors of the device, a harmonic value of a level of concurrency of the device, including:
        determining, by one or more embedded processors of the device, a harmonic value of an integer that is greater, by less than one, than the level of concurrency;
        subtracting, by one or more embedded processors of the device, from the harmonic value of the integer an amount based on a difference between the level of concurrency and the integer; and
        adjusting, by one or more embedded processors of the device, the harmonic value of the level of concurrency based, at least in part, on a reciprocal of the level of concurrency.

4. The method of claim 1, wherein determining whether the count of outstanding requests is contained within the numerical range comprises:
    determining, by one or more embedded processors of the device, that the count of outstanding requests of the device is not contained within the numerical range; and
    repeatedly updating, by one or more embedded processors of the device, each of the lower boundary value and the upper boundary value such that the numerical range shifts toward the count of outstanding requests until the count of outstanding requests is contained within the numerical range.

5. The method of claim 1, wherein determining whether the count of outstanding requests is contained within the numerical range comprises:
    determining, by one or more embedded processors of the device, that the count of outstanding requests of the device is not contained within the numerical range; and
    repeatedly updating, by one or more embedded processors of the device, each of the lower boundary value and the upper boundary value such that the numerical range shifts toward the count of outstanding requests for a pre-determined number of repetitions.

6. The method of claim 1, wherein determining whether the count of outstanding requests is contained within the numerical range comprises:
    determining that the count of outstanding requests is inclusively between the lower boundary value and the upper boundary value; and
    repeatedly updating, by one or more embedded processors of the device, each of the lower boundary value and the upper boundary value for a pre-determined number of repetitions, by:
        partitioning, by one or more embedded processors of the device, the numerical range into a plurality of portions; and
        updating the upper boundary value and the lower boundary value based on a portion of the numerical range that contains the count of outstanding requests.

7. The method of claim 1, wherein the device is a network adaptor.

8. A computer program product for monitoring a level of utilization, the computer program product comprising:
    a computer readable storage medium and program instructions stored on the computer readable storage medium, the program instructions comprising:
        program instructions to determine a threshold based, at least in part, on a count of service channels of a device;
        program instructions to determine an upper boundary value of a numerical range based, at least in part, on the count of service channels;
        program instructions to determine a lower boundary value of the numerical range based, at least in part, on the threshold;
        program instructions to determine whether a count of outstanding requests of the device is contained within the numerical range;
        program instructions to determine, by an embedded processor of the device, an estimated level of utilization of the device based, at least in part, on the upper boundary value, the lower boundary value, the count of service channels, and the count of outstanding requests; and
        program instructions to report the estimated level of utilization.

9. The computer program product of claim 8, wherein the program instructions to determine the threshold is further based on a harmonic number of a value based on the count of service channels.

10. The computer program product of claim 9, wherein the program instructions to determine the threshold further comprise:
    program instructions to determine a harmonic value of a level of concurrency of the device, including:
        program instructions to determine a harmonic value of an integer that is greater, by less than one, than the level of concurrency;
        program instructions to subtract from the harmonic value of the integer an amount based on a difference between the level of concurrency and the integer; and
        program instructions to adjust the harmonic value of the level of concurrency based, at least in part, on a reciprocal of the level of concurrency.

11. The computer program product of claim 8, wherein the program instructions to determine whether the count of outstanding requests is contained within the numerical range comprise:
- program instructions to determine that the count of outstanding requests of the device is not contained within the numerical range; and
- program instructions to repeatedly update each of the lower boundary value and the upper boundary value such that the numerical range shifts toward the count of outstanding requests until the count of outstanding requests is contained within the numerical range.

12. The computer program product of claim 8, wherein the program instructions to determine whether the count of outstanding requests is contained within the numerical range comprise:
- program instructions to determine that the count of outstanding requests of the device is not contained within the numerical range; and
- program instructions to repeatedly update each of the lower boundary value and the upper boundary value such that the numerical range shifts toward the count of outstanding requests for a pre-determined number of repetitions.

13. The computer program product of claim 8, wherein determining whether the count of outstanding requests is contained within the numerical range comprises:
- program instructions to determine that the count of outstanding requests is inclusively between the lower boundary value and the upper boundary value; and
- program instructions to repeatedly update each of the lower boundary value and the upper boundary value for a pre-determined number of repetitions, including:
  - program instructions to partition the numerical range into a plurality of portions; and
  - program instructions to update the upper boundary value and the lower boundary value based on a portion of the numerical range that contains the count of outstanding requests.

14. The computer program product of claim 8, wherein the program instructions to report the estimated level of utilization include program instructions to report, by the embedded processor of the device, the estimated level of utilization of the device.

15. A computer system for monitoring a level of utilization, the computer system comprising:
- one or more embedded computer processors of a device;
- one or more computer readable storage media;
- program instructions stored on the computer readable storage media for execution by at least one of the one or more embedded computer processors, the program instructions comprising:
  - program instructions to determine a threshold based, at least in part, on a count of service channels of a device;
  - program instructions to determine an upper boundary value of a numerical range based, at least in part, on the count of service channels;
  - program instructions to determine a lower boundary value of the numerical range based, at least in part, on the threshold;
  - program instructions to determine whether a count of outstanding requests of the device is contained within the numerical range;
  - program instructions to determine an estimated level of utilization of the device based, at least in part, on the upper boundary value, the lower boundary value, the count of service channels, and the count of outstanding requests; and
  - program instructions to report the estimated level of utilization.

16. The computer system of claim 15, wherein the program instructions to determine the threshold is further based on a harmonic number of a value based on the count of service channels.

17. The computer system of claim 16, wherein the program instructions to determine the threshold further comprise:
- program instructions to determine a harmonic value of a level of concurrency of the device, including:
  - program instructions to determine a harmonic value of an integer that is greater, by less than one, than the level of concurrency;
  - program instructions to subtract from the harmonic value of the integer an amount based on a difference between the level of concurrency and the integer; and
  - program instructions to adjust the harmonic value of the level of concurrency based, at least in part, on a reciprocal of the level of concurrency.

18. The computer system of claim 15, wherein the program instructions to determine whether the count of outstanding requests is contained within the numerical range comprise:
- program instructions to determine that the count of outstanding requests of the device is not contained within the numerical range; and
- program instructions to repeatedly update each of the lower boundary value and the upper boundary value such that the numerical range shifts toward the count of outstanding requests until the count of outstanding requests is contained within the numerical range.

19. The computer system of claim 15, wherein the program instructions to determine whether the count of outstanding requests is contained within the numerical range comprise:
- program instructions to determine that the count of outstanding requests of the device is not contained within the numerical range; and
- program instructions to repeatedly update each of the lower boundary value and the upper boundary value such that the numerical range shifts toward the count of outstanding requests for a pre-determined number of repetitions.

20. The computer system of claim 15, wherein determining whether the count of outstanding requests is contained within the numerical range comprises:
- program instructions to determine that the count of outstanding requests is inclusively between the lower boundary value and the upper boundary value; and
- program instructions to repeatedly update each of the lower boundary value and the upper boundary value for a pre-determined number of repetitions, including:
  - program instructions to partition the numerical range into a plurality of portions; and
  - program instructions to update the upper boundary value and the lower boundary value based on a portion of the numerical range that contains the count of outstanding requests.

* * * * *